(12) United States Patent
Zhu

(10) Patent No.: US 9,497,523 B2
(45) Date of Patent: Nov. 15, 2016

(54) ARRANGEMENT FOR DEPLOYING CO-EXISTING GPON AND XGPON OPTICAL COMMUNICATION SYSTEMS

(75) Inventor: Benyuan Zhu, Princeton, NJ (US)

(73) Assignee: OFS FITEL, LLC, Norcross, GA (US)

( * ) Notice: Subject to any disclaimer, the term of this patent is extended or adjusted under 35 U.S.C. 154(b) by 95 days.

(21) Appl. No.: 14/342,642

(22) PCT Filed: Sep. 10, 2012

(86) PCT No.: PCT/US2012/054487
§ 371 (c)(1),
(2), (4) Date: Mar. 4, 2014

(87) PCT Pub. No.: WO2013/036945
PCT Pub. Date: Mar. 14, 2013

(65) Prior Publication Data
US 2014/0219660 A1 Aug. 7, 2014

Related U.S. Application Data

(60) Provisional application No. 61/532,541, filed on Sep. 8, 2011.

(51) Int. Cl.
*H04B 10/00* (2013.01)
*H04Q 11/00* (2006.01)
*H04J 14/02* (2006.01)
*H04B 10/25* (2013.01)

(52) U.S. Cl.
CPC ...... *H04Q 11/0067* (2013.01); *H04B 10/2503* (2013.01); *H04J 14/025* (2013.01); *H04J 14/0227* (2013.01); *H04J 14/0246* (2013.01); *H04J 14/0247* (2013.01); *H04J 14/0252* (2013.01); *H04J 14/0282* (2013.01); *H04Q 2011/0086* (2013.01)

(58) Field of Classification Search
USPC .................................................... 398/66–73
See application file for complete search history.

(56) References Cited

U.S. PATENT DOCUMENTS

| | | | | |
|---|---|---|---|---|
| 7,440,701 | B2 * | 10/2008 | Li et al. | 398/135 |
| 7,970,281 | B2 * | 6/2011 | Bouda | 398/99 |
| 8,180,223 | B2 * | 5/2012 | Bouda et al. | 398/89 |
| 8,412,044 | B2 * | 4/2013 | Ota et al. | 398/72 |
| 8,417,117 | B2 * | 4/2013 | Smith et al. | 398/58 |
| 8,488,977 | B2 * | 7/2013 | Kim et al. | 398/175 |
| 8,538,262 | B2 * | 9/2013 | Beckett et al. | 398/63 |
| 8,705,952 | B2 * | 4/2014 | Grobe et al. | 398/7 |

(Continued)

*Primary Examiner* — Agustin Bello
(74) *Attorney, Agent, or Firm* — Wendy W. Koba, Esq.

(57) ABSTRACT

A passive, coexisting 10 Gb/s passive optical network (XG-PON) and Gb/s passive optical network (GPON) is created by using a pair of counter-propagating laser pump sources at a network-based optical line terminal, in combination with a feeder fiber, to create distributed Raman amplification for the upstream signals associated with both GPON and XGPON systems. A passive remote node is located at the opposite end of the feeder fiber, in the vicinity of a group of end-user locations, and includes a cyclic WDM and a pair of power splitters for the GPON and XGPON signals such that the GPON signals are thereafter directed through a first power splitter into optical network units (ONUs) specifically configured for GPON wavelengths and XGPON signals are directed through a second power splitter into ONUs configured for the XGPON wavelengths. The arrangement of the remote node allows for the reach and split ratios of the GPON and XGPON systems to be individually designed for optimum performance.

28 Claims, 9 Drawing Sheets

(56) References Cited

U.S. PATENT DOCUMENTS

| | | | |
|---|---|---|---|
| 2004/0091265 A1* | 5/2004 | Kim et al. | 398/72 |
| 2005/0041971 A1* | 2/2005 | Lee et al. | 398/72 |
| 2006/0082866 A1* | 4/2006 | Takahashi et al. | 359/334 |
| 2006/0153565 A1* | 7/2006 | Park et al. | 398/71 |
| 2006/0153567 A1* | 7/2006 | Kim et al. | 398/72 |
| 2007/0092255 A1* | 4/2007 | Bouda | 398/72 |
| 2007/0140693 A1* | 6/2007 | Li et al. | 398/67 |
| 2007/0147837 A1* | 6/2007 | Yoo et al. | 398/72 |
| 2007/0166037 A1* | 7/2007 | Palacharla et al. | 398/72 |
| 2007/0166043 A1* | 7/2007 | Bouda et al. | 398/147 |
| 2007/0264021 A1* | 11/2007 | Li et al. | 398/135 |
| 2008/0273877 A1* | 11/2008 | Palacharla et al. | 398/64 |
| 2011/0026922 A1* | 2/2011 | Ota et al. | 398/70 |
| 2011/0158653 A1* | 6/2011 | Mazed | 398/140 |
| 2011/0188859 A1* | 8/2011 | Wen et al. | 398/79 |
| 2011/0222857 A1* | 9/2011 | Wen et al. | 398/79 |
| 2013/0089319 A1* | 4/2013 | Grobe et al. | 398/7 |
| 2014/0219660 A1* | 8/2014 | Zhu | 398/67 |

* cited by examiner

10

(a)

(b)

(a)

(b)

ARRANGEMENT FOR DEPLOYING CO-EXISTING GPON AND XGPON OPTICAL COMMUNICATION SYSTEMS

CROSS-REFERENCE TO RELATED APPLICATIONS

This application claims the benefit of U.S. Provisional Application Ser. No. 61/532,541, filed Sep. 8, 2011 and herein incorporated by reference.

TECHNICAL FIELD

The present invention relates to systems for deploying a passive optical network (PON) in a manner that allows for both a gigabit passive optical communication system (GPON) and a 10-gigabit passive optical communication system (XGPON) to co-exist within the same network architecture.

BACKGROUND OF THE INVENTION

To meet the ever-increasing demand for high-speed Internet access and services, many network operators are deploying, or planning to deploy, passive optical networks. A passive optical network (PON) is a point-to-multipoint, fiber-to-the-premises, broadband network architecture in which unpowered ("passive") optical splitters are used to enable a single optical fiber to serve multiple customer premise locations (this single fiber referred to at times as a "feeder fiber"). As shown in FIG. 1, a typical prior art PON 10 includes an optical line terminal (OLT) 12 at a service provider's central office (CO) and a multiplicity of optical network units or terminals (ONUs or ONTs, hereinafter simply referred to as "ONUs") 14 located at or in the vicinity of end users (i.e. subscriber or customer premise locations). A single OLT 12 is optically coupled to a plurality of ONUs 14 via an optical distribution network (ODN) 16 comprising a transmission optical fiber 18 (the "feeder fiber") that terminates at a remote node (RN) 20 located in relatively close proximity to ONUs 14. A 1:N passive optical splitter 22 is located within remote node 20 and is used to divide the arriving signal into a plurality of N sub-signals (in this example, N is 32) so as to complete the communication path to each separate ONU 14. The ODN is often referred to as the "outside plant".

Even though it is apparent that the terminals (OLTs and ONUs) of the network include active components and/or circuits that require electrical power, a PON is said to be passive so long as the ODN portion of the network is passive (i.e., does not require electrical power), it is common in the industry to refer to the entire network as being passive.

The number of ONUs that communicate with a single OLT is determined by the split ratio (1:N) of power splitter 22. Each ONU 14 terminates the optical fiber transmission line and provides bidirectional communication with OLT 12. The ability to use only a single fiber between OLT 12 and splitter 22 is made possible by using wavelength division multiplexing (WDM) to maintain separation between the "downstream" and "upstream" signals (where "downstream" refers to those optical signals transmitted from OLT 12 to ONUs 14 and "upstream" refers to those optical signals transmitted from the various ONUs 14 to OLT 12). In a GPON system configured in accordance with industry standards (for example, ITU-T G.984.5, which defines the use of the "narrow wavelength" option for upstream signals), the downstream signals are transmitted at a wavelength in the range of 1480-1500 nm and upstream signals are transmitted at a wavelength in the range of 1300-1320 nm. Continuous-mode downstream signals (e.g., 1490 nm signals from OLT 12 to ONUs 14) are broadcast to each ONU sharing the single fiber 18; that is, a downstream signal is divided at splitter 22 into a multiplicity of N (in this example, N=32) sub-signals that are directed onto a multiplicity of N optical fiber paths 24 coupled to different ONUs 14 in a one-to-one relationship. It is to be understood that the sub-signals at the output of splitter 22 are essentially identical to the downstream signal as received at the input of remote node 20, but have lower power due to the inherent function of the splitter.

In contrast to the use of continuous-mode signaling for downstream transmissions, burst-mode transmission is used for the upstream signals created at the various ONUs 14 and directed to the single OLT 12 in the GPON system (e.g., 1310 nm burst-mode signals from ONUs 14 to OLT 12). These upstream signals are combined within splitter 22 using a multiple access protocol, usually time division multiple access (TDMA). For example, OLT 12 may control the transmission of the traffic from the individual ONUs 14 onto shared single fiber 18 via framing and synchronization (not shown) in order to provide time slot assignments for upstream communication.

As mentioned above, PONs do not use electrically-powered components to split the downstream signal. Instead, the signal is distributed among end users by means of passive optical splitters. Each splitter typically divides the signal from the transmission fiber 18 into N drop-line (or fan-out) fibers 24, where N is an integer and commonly depends on the manufacturer, the characteristics of drop-line fibers 24, the distance to the furthest ONU 14, and the like. PON configurations reduce the amount of fiber and service provider equipment needed compared with point-to-point architectures. In addition, a PON requires little maintenance and no electrical powering in the passive outside plant (the ODN), thereby reducing expense for network operators. However, the maximum transmission distance (referred to hereinafter at times as "reach") between OLT 12 and the farthest away ONU 14, as well as the split ratio 1:N, are currently limited by various physical layer limitations and the PON protocol.

For example, although the GPON standard (ITU-T G.984) allows for a logical reach of 60 km and a maximum split ratio of 1:128, a 28 dB loss budget (i.e., acceptable power loss limit for a system) currently limits typical GPON deployments to a 20 km reach and a 1:32 split ratio. Of course, for a given loss budget, if a particular application needs only a relatively small split ratio (e.g., 1:16), then the reach may be longer (e.g., 24 km). Conversely, if an application utilizes only a relatively short reach (e.g., 10 km), then the split ratio may be larger (e.g., 1:64). However, some applications require both a long reach (e.g., 60 km) and a large split ratio (e.g., 1:64).

There have been several techniques attempted to extend the reach of GPON systems. In addition, GPON reach extenders have been standardized recently by the International Telecommunications Union (as explained fully in ITU-T G.984.6). While workable, the reach extension approaches considered in G.984.6 require the use of electrically-powered units in the outside plant—elements such as optical amplifiers or optical-to-electrical-to-optical (OEO) repeaters. As a result, these designs negate some of the advantages of purely passive systems and may not always be practical or cost effective for network service providers/operators, particularly in certain environments where no electrical power is available.

Future access networks will also require increased bit rates up to 10 Gbit/s in order to satisfy the ever-increasing traffic demands of system users. Indeed, a 10 Gbit/s PON (hereinafter referred to as "XGPON") has recently been considered in ITU-T standard G.987.2. To ensure a smooth upgrade from GPON to XGPON for network operators, co-existence of both systems is considered mandatory, and will continue for some time to come. FIG. 2 illustrates an exemplary prior art combined GPON and XGPON system 30, where additional signal paths associated with the XGPON system are added in a straightforward manner to supplement the basic prior art configuration of FIG. 1. In comparing the two systems, GPON/XGPON system 30 is seen to include an additional source 32 and detector 34 disposed at OLT 12 to transmit and receive signals operating at the higher data rate (and using different transmit and receive wavelengths than those associated with GPON systems). In order to transmit these additional wavelengths along feeder fiber 18, a coarse wavelength division multiplexer (CWDM) 36.1 is included within OLT 12 to provide coupling between feeder fiber 18 and a pair of WDMs 36.2 and 36.3 specifically configured to operate at the GPON and XGPON system wavelengths, respectively. A "coarse" WDM simply refers to a WDM that operates with a wider spacing between the wavelengths being separated or combined and, as a result, may require less sophisticated and expensive components than a conventional WDM.

As before, ODN 16 of system 30 is a passive arrangement and includes a feeder fiber 18 and a remote node 20 (the remote node similarly including passive power splitter 22). Here, splitter 22 handles all four wavelengths; the pair of wavelengths associated with the upstream and downstream GPON signals and the pair of wavelengths associated with the upstream and downstream XGPON signals. In this prior art arrangement, splitter 22 is configured to simply split both downstream signals and transmit both along each fiber 24 (and, similarly, combine all of the upstream signals and couple into feeder fiber 18).

In the arrangement as shown in FIG. 2, each ONU 14 is configured to include elements to separate the GPON and XGPON signals such that only either the GPON signals or the XGPON signals are transmitted and received. For example, ONU 14.1 is shown as including a WDM 38.1 and a wavelength blocking filter (WBF) 40.1 that are used in conjunction with a transmitter 37.1 and a receiver 39.1 to communicate with OLT 12. For the sake of discussion, it is presumed that ONU 14.1 includes a transmitter and a receiver configured for the basic GPON system. As mentioned above, each fiber 24 supports the propagation of all signals. Therefore, the downstream input to WDM 38.1 will consist of both the GPON signal (the desired signal) and the XGPON signal (the undesired signal for ONU 14.1). In this prior art arrangement, therefore, WBF 40.1 is configured to "block" the XGPON signal from continuing to propagate and reach receiver 39.1.

Similarly, presuming that ONU 14.2 is associated with the XGPON communication system, WBF 40.2 is configured to block the GPON downstream wavelength, allowing only the XGPON downstream signal to reach receiver 39.2.

While this arrangement is capable of providing communication for both the GPON and XGPON systems through a single network, it requires each ONU to include a WDM and associated WBF in order to ensure that each ONU 14 receives signals from its associated system. The overall network itself remains limited in terms of both its reach and split ratio since it needs to accommodate all of the different wavelengths associated with each transmission system.

Thus, a need remains for an optical communication system that allows for an XGPON system to coexist with a GPON system that retains the truly passive nature of the distribution network while still providing opportunities for extended reach and/or increased splitting ratio.

SUMMARY OF THE INVENTION

The needs remaining in the prior art are addressed by the present invention, which relates to systems for deploying a gigabit passive optical network (GPON) and a 10-gigabit passive optical network (XGPON) within the same architecture as co-existing systems.

In accordance with the present invention, a passive, co-existing XGPON and GPON compatible system is created by using a pair of counter-propagating laser pump sources at an OLT to provide Raman amplification for the upstream GPON and XGPON signals along an extended portion of the feeder fiber. A passive remote node formed in accordance with the present invention utilizes a cyclic WDM and separate power splitters for the GPON and XGPON signals. The use of separate power splitters for each data rate allows for the splitting ratios associated with each communication network to be separately optimized. The configuration of the remote node to independently process the GPON and XGPON signals allows for the architecture of the present invention to handle both GPON and XGPON in a co-existing arrangement or, alternatively, only GPON signals or only XGPON signals, if desired. Additionally, by separating the GPON and XGPON signals at the remote node, the components in each ONU can be simplified, since each ONU will handle only GPON or XGPON signals.

As a result of the inventive arrangement, it is possible to increase both the reach and split ratio parameters of the overall system communication while supporting communication for both the GPON and XGPON networks. In particular, inasmuch as the arrangement of the present invention allows for different split ratios to be used for each specific data rate, the individual power split ratios can be selected to satisfy the specific requirements associated with each network.

While the following will describe an exemplary architecture of the present invention with respect to co-existing GPON and XGPON systems, it is to be understood that the same or similar architecture may be used with other data rates and/or other signaling wavelengths (with pump wavelengths then modified accordingly). Indeed, in its most general form, the architecture of the present invention may be used with multiple data rates (i.e., more than two data rates), with the remote node configured to separate out the signaling pairs associated with each data rate, using a separate power splitter for each data rate.

In one exemplary embodiment, the remote node in the passive network architecture of the present invention utilizes a first power splitter with a 1:64 split ratio for the GPON signal traffic and a second power splitter with a 1:32 split ratio for the XGPON traffic, yielding a combined splitting ratio of 1:96. As will be discussed in detail below, a remote node utilizing these split ratios has successfully been used in a system having an extended reach length on the order of 50 km. These exemplary values do exhibit significant improvement over the current state of the art.

Obviously, as mentioned above, different combinations of reach length and split ratios may be used, depending on the specific parameters of the system where the network is deployed. Indeed, it is possible that some systems could use an arrangement where the split ratio associated with the XGPON signals is larger than the split ratio used with the GPON signals.

If amplification of the downstream signals is also desired (for example, to meet a specific loss budget requirement), discrete amplification is used at the OLT to boost one or both of the GPON and XGPON signals at the point of origination. This discrete amplification can take the form of, for example, semiconductor optical amplifiers, discrete Raman amplifiers, doped fiber amplifiers, or the like. With the addition of signal amplification in this manner, it is possible to extend the reach of the system to at least 50 km while maintaining the above-described 1:96 split ratio within a purely passive optical distribution network.

In a further embodiment of the present invention, the expense of an XGPON transmission system is reduced by sharing a single XGPON arrangement with a number of separate GPON systems, using a passive splitting arrangement to "overlay" a single XGPON arrangement on a plurality of n separate GPON systems. In this case, a bi-directional optical amplifier is used to increase the power of the XGPON signals so that they may be distributed across a number of separate GPON networks.

In general, an optical distribution network formed in accordance with the present invention may be configured to handle more than two separate communication systems (i.e., more than two different data rates), with a different pair of wavelengths associated with each system. Indeed, an exemplary embodiment of the present invention takes the form of an optical distribution network for supporting communication at different data rates, each data rate associated with a different pair of upstream and downstream communication wavelengths and comprising a transmission fiber for supporting optical communication at each wavelength propagating downstream from an OLT to a plurality of ONUs, and at each wavelength propagating upstream from the plurality of ONUs to the OLT, a passive remote node coupled to a far-end termination of the transmission fiber and including: (1) a cyclic WDM including a plurality of wavelength-selective elements for separating the downstream wavelengths onto separate signal paths and combining a plurality of upstream wavelengths and coupling the upstream wavelengths into the transmission fiber; and (2) a plurality of power splitters, each power splitter coupled to a separate signal path and associated with a separate downstream wavelength, each splitter for dividing its associated downstream signal into a plurality of sub-signals to be transmitted to a set of predefined ONUs. This embodiment also includes a plurality of optical pump sources coupled to a near-end termination of the transmission fiber for providing counter-propagating pumps to amplify the plurality of upstream optical communication signals.

An exemplary method of the present invention can be defined as a method of extending the reach or increasing the split ratio (or both) of a bidirectional optical distribution network operating at least two different data rates, each data rate having a pre-defined downstream wavelength and upstream wavelength, the method comprising the steps of: providing a transmission optical fiber; inserting counter-propagating pumps into the transmission optical fiber to provide Raman amplification for each upstream wavelength, the wavelengths selected for the pumps based upon the values of each upstream wavelength and extending the reach of the bidirectional distribution network; demultiplexing the downstream wavelengths at a location in the proximity of a plurality of ONUs; splitting each downstream wavelength into a plurality of sub-signals, wherein each separate downstream wavelength is split into a preferred number of sub-signals to extend the split ratio of the bidirectional optical distribution network and transmitting each sub-signal toward a different ONU.

Other and further embodiments, configurations, aspects and advantages of the present invention will become apparent during the course of the following discussion and by reference to the accompanying drawings.

BRIEF DESCRIPTION OF THE DRAWINGS

Referring now to the drawings where like numerals represent like parts in several views.

Figure 1:
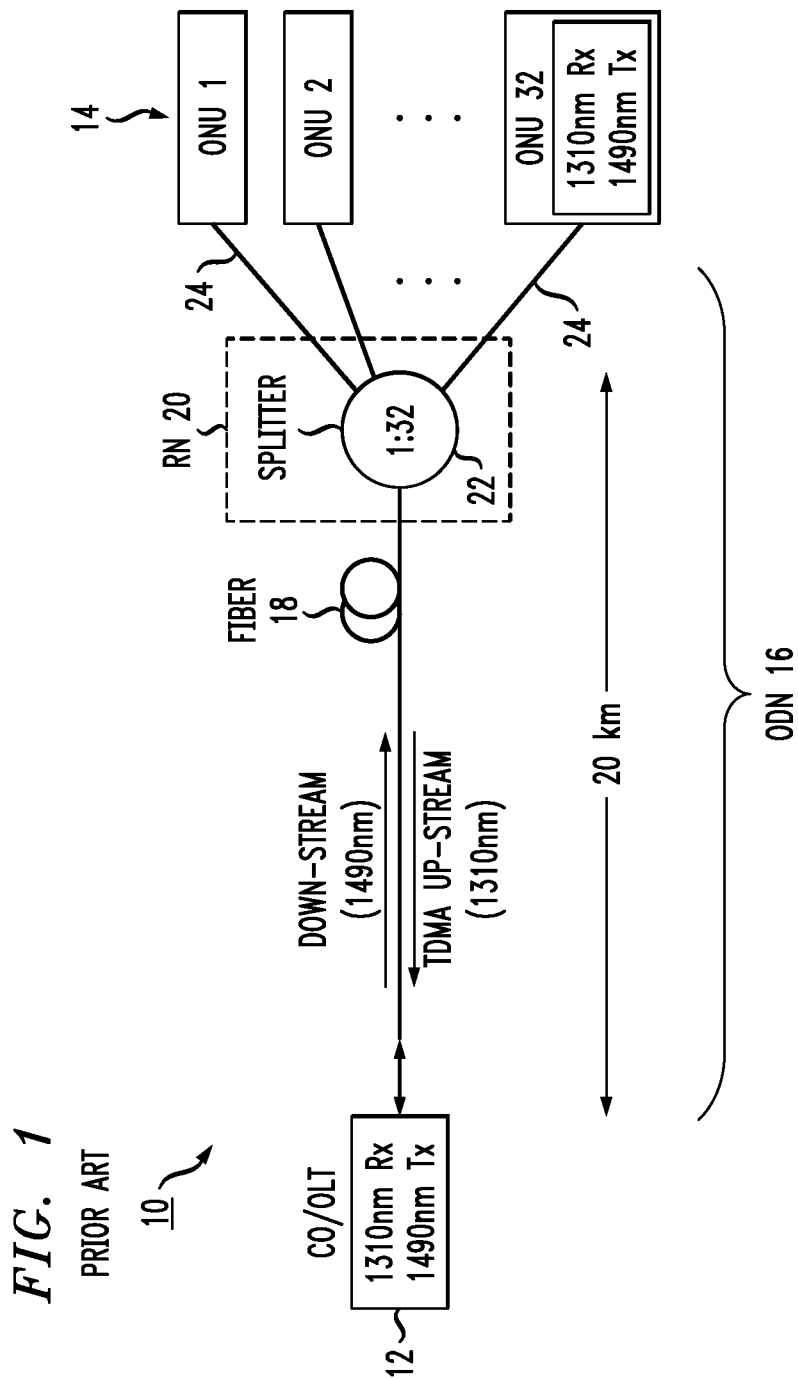
FIG. 1 illustrates a prior art PON network.

The headings used herein are for organizational purposes only and are not meant to be used to limit the scope of the description or the claims. As used throughout this application, the term "may" is used in a permissive sense (i.e., meaning "having the potential to"), rather than the mandatory sense (i.e., meaning "must"). Similarly, the terms "include", "including" and "includes" are considered to mean "including, but not limited to". To facilitate understanding, like reference numerals have been used, where possible, to designate like elements common to the figures.

DETAILED DESCRIPTION

Figure 3:
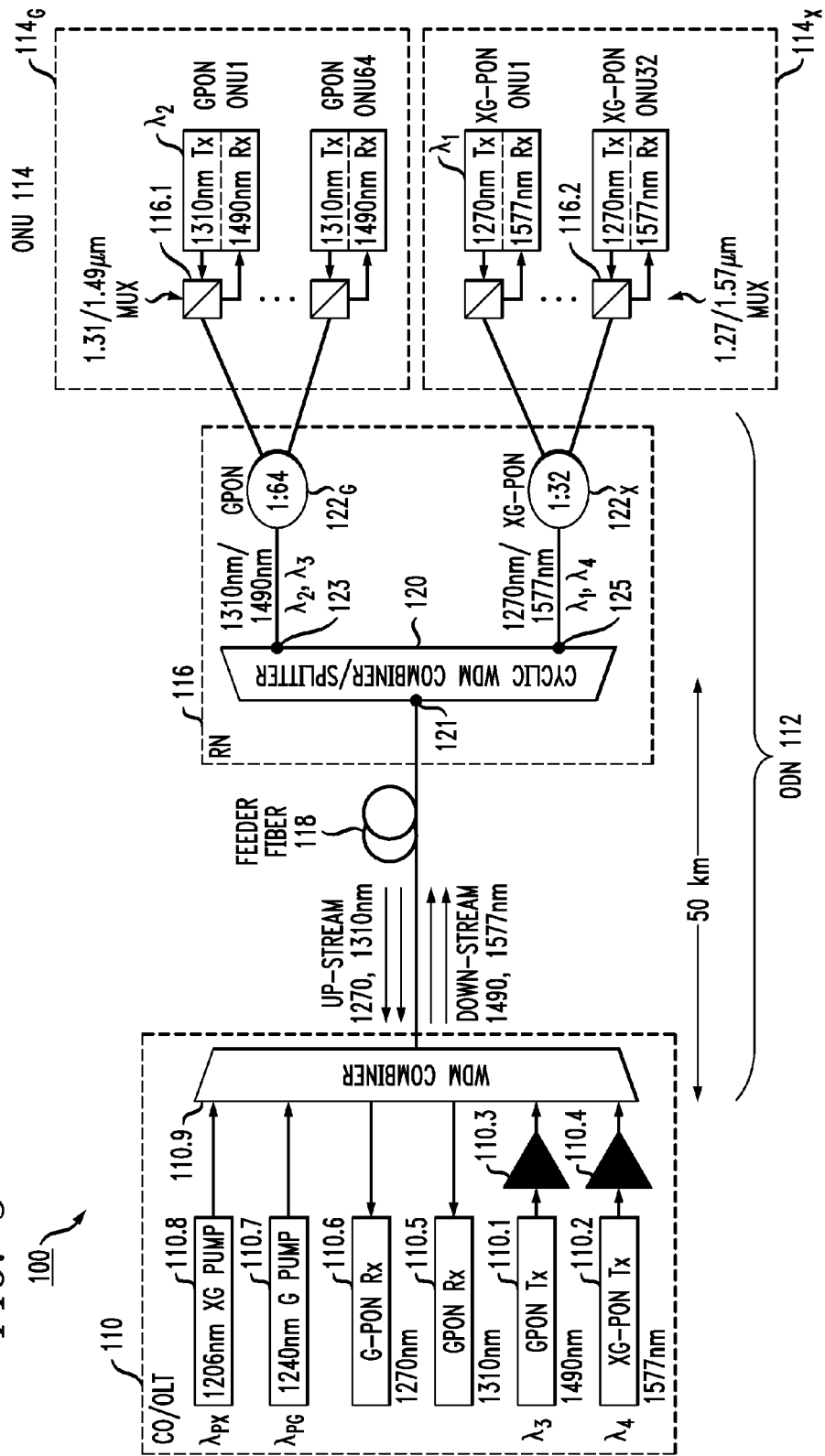
FIG. 3 illustrates an exemplary PON formed in accordance with the present invention for extending the reach and/or increasing the split ratio in a bidirectional communication system that supports both GPON and XGPON data rates, without needing to introduce any active components within the optical distribution network (ODN)

FIG. 3 illustrates an exemplary passive optical network (PON) 100 formed in accordance with the present invention. As with the various prior art arrangements described above, PON 100 includes an OLT, ODN and a number of remotely-located ONUs. In the specific arrangement of FIG. 3, PON 100 includes an OLT 110, an ODN 112 and a plurality of ONUs 114. As will be discussed in detail below, the plurality of ONUs 114 includes a first set of ONUs $114_G$ associated with communications involving a GPON system and a second set of ONUs $114_X$ associated with communications involving an XGPON system.

As mentioned above, inasmuch as separate ONUs are used for each system (GPON or XGPON), it is possible for the arrangement of the present invention to perform solely as a GPON system, solely as an XGPON system, or as a combination, co-existing GPON/XGPON system, and in each instance provide the desired goals of extended reach and increased split ratio while maintaining a passive network architecture. While shown as separate and distinct elements in the diagram of FIG. 3, it is to be understood that ONUs for GPON and XGPON signals may be co-located at the same subscriber premises; indeed, in a preferred embodiment of the present invention, it is contemplated that end user locations may be configured to handle both GPON and XGPON signals and will include the necessary components each type of signal.

In accordance with this FIG. 3 embodiment of the present invention, OLT 110 is configured to include separate transmitters for the GPON and XGPON downstream data signals, shown as transmitting element 110.1 for providing the GPON downstream signal (operating at a predetermined wavelength $\lambda_3$) and transmitting element 110.2 for providing the XGPON downstream signal (at wavelength $\lambda_4$). In one exemplary arrangement, GPON transmitting element 110.1 comprises a distributed feedback (DFB) laser diode (LD) operating at a wavelength $\lambda_3$=1490 nm, and XGPON transmitting element 110.2 comprises an electro-absorption modulated laser (EML) operating at a wavelength $\lambda_4$=1577 nm. The chromatic dispersion impairment associated with the propagation of the XGPON downstream signal at this 1577 nm wavelength can be mitigated by applying a strong reverse bias to the EML device, introducing a negative chirp into the signal. Obviously, other types of lasing devices may be used for providing optical transmission signals at wavelengths suitable for supporting transmission at the data rates of 2.5 Gb/s and 10 Gb/s (or other data rates, as desired).

If necessary to increase the power of the downstream signals (i.e., for longer reach requirements, larger split ratios, system loss budget requirements or the like), a discrete optical amplifier may be used with the transmitting elements at OLT 110. The embodiment of FIG. 3 illustrates this additional boost for the downstream signals in the form of a first semiconductor optical amplifier (SOA) 110.3 associated with GPON downstream transmitting element 110.1 and a second SOA 110.4 associated with XGPON downstream transmitting element 110.2. It should be understood that this arrangement is exemplary only, and various other types of discrete optical amplifiers, such as discrete Raman amplifiers, fiber-based amplifiers, or the like, may be used. Further, it is possible that only one of the downstream signals (for example, the XGPON signal) requires boosting, where in this case only a single discrete amplifier is included in OLT 110. Although not specifically shown in the arrangement of FIG. 3, optical isolators may be disposed in the signal paths between the transmitting elements and their respective SOAs.

OLT 110 also includes separate receiving components associated with recovering upstream data transmissions at both the GPON upstream wavelength ($\lambda_2$) and the XGPON upstream wavelength ($\lambda_1$), shown as receivers 110.5 and 110.6, respectively. While not shown in detail, these receivers comprise conventional optical receiver arrangements including, for example, a photodiode (e.g., an APD) for receiving the incoming optical signal and converting it to an electrical equivalent, followed by electrical amplification and clock recovery circuitry. These details of specific receiver arrangements are not considered to be germane to the subject matter of this invention.

As described above, it is an aspect of the present invention to utilize counter-propagating pumps with both upstream transmission signals to create Raman amplification of the upstream signals along an extended portion of feeder fiber 118 and thus increase the power level of the upstream signals received at OLT 110. The specific wavelengths selected for these pumps are determined as a function of the upstream wavelength values, taking into consideration the optimized Raman gain efficiency, as well as limitations associated with pump-pump and pump-signal cross-talk.

Raman gain arises from the transfer of optical power from one optical beam to another beam that is down-shifted in frequency. Whether or not Raman gain/amplification of a signal is in fact realized at any point along feeder fiber 118 depends on the intensity/power of the pump light and the loss associated with feeder fiber 118, as is well known in the art. Preferably, although not necessarily, feeder fiber 118 will exhibit gain/amplification along its entire length.

For the specific embodiment of FIG. 3, a first pump source 110.7 at a wavelength $\lambda_{PG}$=1240 nm is used to provide Raman amplification of the upstream GPON signal ($\lambda_2$=1310 nm) and a second pump source 110.8 at a wavelength $\lambda_{PX}$=1206 nm is used to provide Raman amplification of the upstream XGPON signal ($\lambda_1$=1270 nm). It is to be understood that other pump wavelengths (or more than one pump source) may be used for specific arrangements, where other pump wavelengths may exhibit different values of Raman gain efficiency.

Figure 4:
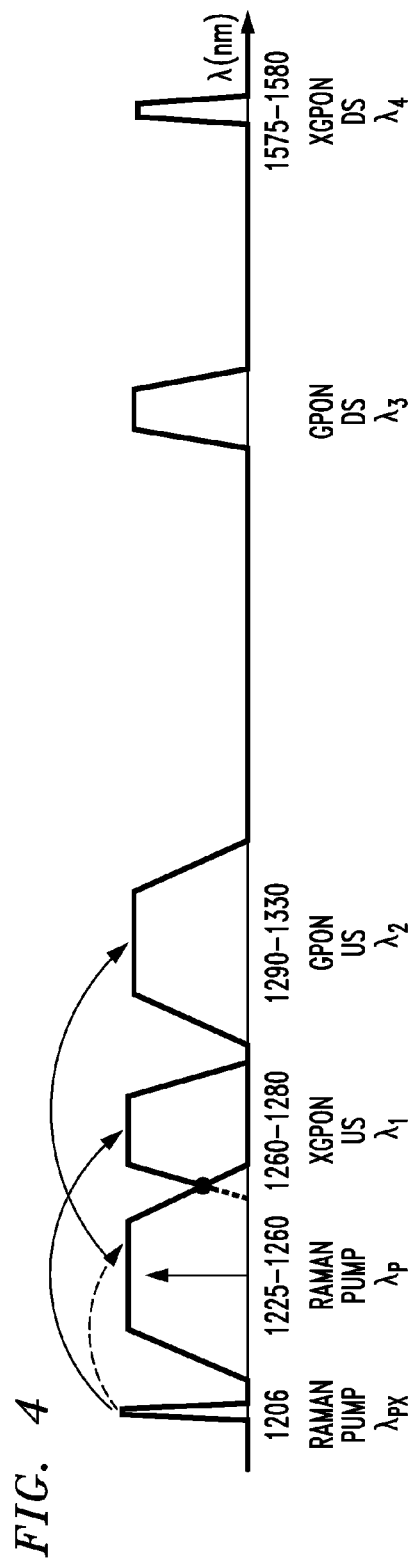
FIG. 4 depicts a set of exemplary wavelengths associated with upstream and downstream communication for a GPON system and a co-existing XGPON system, as well as the wavelengths for exemplary counter-propagating pumps used with both upstream signals.

FIG. 4 is a graph illustrating these exemplary wavelength values and ranges for the pumps and communication signals as discussed above, as well as the relationships between these signals for one specific embodiment of a co-existing GPON and XGPON systems in accordance with the present invention. As shown, when the XGPON upstream wavelength $\lambda_1$ is selected to be about 1270 nm, a pump operating at a wavelength $\lambda_{PX}$=1206 nm will transfer power to this XGPON upstream signal (that is, provide Raman amplification), as shown by the arrow in FIG. 4. For an upstream GPON signal operating at $\lambda_2$=1310 nm, a pump operating at a wavelength $\lambda_{PG}$=1240 nm may be used. The wavelength ranges for the downstream signals are also shown in FIG. 4, with an exemplary wavelength range of 1480-1490 nm associated with the downstream GPON signal $\lambda_3$ and an exemplary wavelength range of 1575-1580 nm associated with the downstream XGPON signal $\lambda_4$.

It is to be understood that the XGPON pump from source 110.8 should also operate at a power level sufficient to provide enough on-off Raman gain to accommodate the total link loss budget of the communication system. Additionally, while a wavelength of 1206 nm is considered optimal for $\lambda_{PX}$, other wavelengths in the range of about 1201-1211 nm may also be used, and selected in accordance with a number of different system considerations, including but not limited to, the reach length and the split ratio of a specific system being designed.

With respect to the selection of the proper wavelength for GPON pump source 110.7, this is a function of at least the wavelength range of the upstream signal. That is, for a GPON upstream signal that is limited to within a narrow wavelength range, for example 1300-1320 nm, a single pump wavelength at about 1240 nm is sufficient to provide the desired amount of Raman amplification. This set of specifications is particularly defined as the "narrowband" implementation of GPON under ITU-T G-984.5. However, the GPON upstream signal may operate over a wider spectrum, for example 1290-1330 nm, in accordance with an earlier implementation of the standard. In this "wideband" embodiment, two pumps operating at different wavelengths may be required to provide the desired relatively flat gain profile over the entire wavelength range of the GPON upstream signal. The latter condition is likely in cases where un-cooled laser diodes are used as the GPON upstream transmitters.

As also shown in FIG. 4, care must be taken to optimize the design of the individual pump powers and wavelength values to mitigate the interaction between the pumps and the upstream signals. For example, it is known that the XGPON pump at 1206 nm will transfer a portion of its power to the GPON pump at 1240 nm (shown by the dotted line in FIG. 4.). To compensate for this transfer of power, the power level of XGPON pump source 110.8 can be increased above a nominal level (in situations where the XGPON and GPON systems co-exist). Obviously, if the arrangement as shown in FIG. 3 is using only one data rate or the other (i.e., operating as only a GPON system or only as an XGPON system), there is no need to be concerned about the coupling between adjacent pumps.

Additionally, it is preferred to avoid interactions between the upper end of the GPON pump range (i.e., approaching 1260 nm) and the lower end of the XGPON upstream signal spectrum (also approaching 1260 nm), as indicated by point A in FIG. 4. Indeed, performance will be improved if the power of the GPON pump is reduced in the shaded region associated with the overlap with the XGPON upstream signal. For example, maintaining the tail of the GPON pump power to a value below about −20 dB of the spectral value of the XGPON signal has been found suitable. As a further measure, the wavelength of the GPON pump can be restricted to a smaller, lower wavelength range, while increasing its power (if necessary) to compensate for the shift in pump wavelength with respect to the GPON upstream signal that it is amplifying. The latter consideration naturally occurs for the "narrowband" embodiment of the GPON standard, where the narrowed wavelength range for the upstream GPON signal allows for a GPON pump centered at 1240 nm to be acceptable.

In any event, it is to be understood that the specific values selected for the pump wavelengths and powers are all functions of various system parameters, including selected signal wavelengths and the properties of feeder fiber 118 in its role as a fiber Raman amplifier (including, for example, its length, loss spectrum, transmission wavelengths and the like), and the split ratios used at the far-end of the system.

Figure 5:
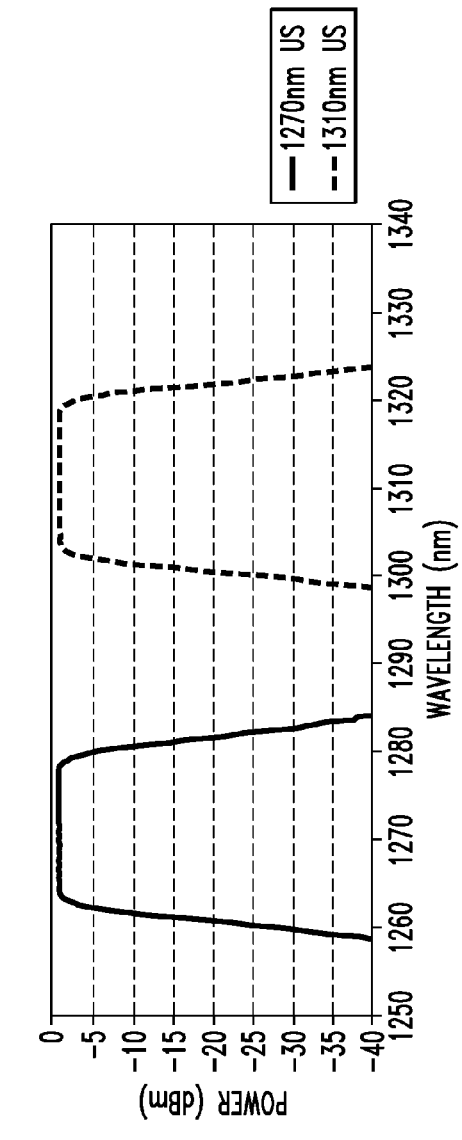
FIG. 5 is a graph of the transmissivity of GPON and XGPON upstream signals as a function of wavelength as they pass through an exemplary wavelength division multiplexer utilized within an optical line terminal (OLT) of the present invention.

Referring back to FIG. 3, OLT 110 is seen to also comprise a WDM 110.9 that is specifically designed to combine and separate the various wavelengths used within OLT 110. In particular, these wavelengths include: (1) the upstream and downstream wavelengths for the standard GPON system; (2) the upstream and downstream wavelengths for the overlay XGPON system; and (3) the pair of counter-propagating pump wavelengths used to amplify the upstream GPON and XGPON signals. The passbands for the GPON and XGPON upstream and downstream signals are preferably designed to be compatible with ITU-T standards for bandwidth specifications, while also allowing for unwanted Raman ASE accumulated noise to be filtered for the upstream signals. FIG. 5 is a graph of the transmissivity as a function of wavelength for the exemplary upstream wavelengths of 1270 nm (XGPON) and 1310 nm (GPON) signals that pass through WDM 110.9. As evident by the passbands associated with these signals, WDM 110.9 enables filtering of accumulated noise (such as Raman ASE) outside of the narrow bands associated with these upstream signals.

Continuing with the description of network 100 in FIG. 3, ODN 112 is shown as comprising a feeder fiber 118 and a remote node 116. Feeder fiber 118 is the transmission fiber used to support the bidirectional propagation of the upstream and downstream signals, and in most cases comprises a conventional single mode fiber. In accordance with the present invention, Raman amplification of the upstream GPON and XGPON signals is provided along at least an extended portion of feeder fiber 118 by using counter-propagating pumps (operating at appropriate wavelengths) that are coupled into feeder fiber 118.

In accordance with the present invention, remote node 116 of ODN 112 is a purely passive element that is able to handle the multiple wavelengths involved with co-existing GPON and XGPON systems. In the specific embodiment of FIG. 3, remote node 116 is shown as comprising a cyclic, 3-port WDM 120 and a pair of splitters 122$_G$ and 122$_X$. As will be described in detail below in association with FIG. 6, cyclic WDM 120 is a three-port device, with a first port 121 coupled to feeder fiber 118 and supporting communication at all four communication wavelengths (GPON upstream wavelength $\lambda_2$ and downstream wavelength $\lambda_3$, as well as XGPON upstream wavelength $\lambda_1$ and downstream wavelength $\lambda_4$). A second port 123 is associated with the GPON wavelengths and a third port 125 is associated with the XGPON wavelengths. Within cyclic WDM 120, the various wavelengths are separated and then re-combined so that the GPON upstream and downstream wavelengths ($\lambda_2$, $\lambda_3$) appear at second port 123 and the XGPON upstream and downstream wavelengths ($\lambda_1$, $\lambda_4$) appear at third port 125.

Figure 6:
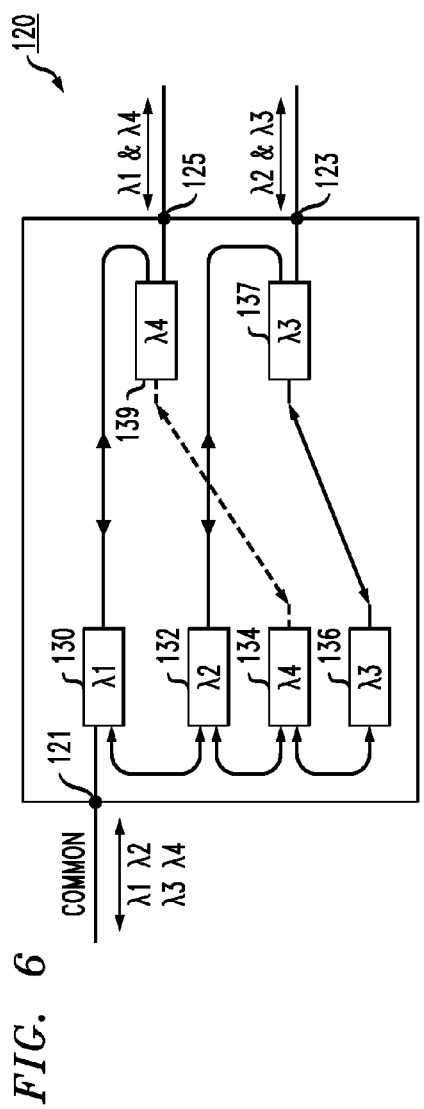
FIG. 6 illustrates an exemplary embodiment of a cyclic wavelength division multiplexer (WDM) utilized within the passive remote node of an optical distribution network (ODN) formed in accordance with the present invention.

With reference to FIG. 6, an exemplary detailed configuration of an exemplary cyclic WDM 120 is shown, with ports 121, 123 and 125 used as defined above. Cyclic WDM 120 is also shown as comprising a set of wavelength-specific filters, including a first wavelength selective filter 130 that is used to separate the XGPON upstream wavelength $\lambda_1$ (the shortest wavelength) from the remaining set of wavelengths. In a similar manner, a second wavelength selective filter 132 is used to separate out the GPON upstream wavelength $\lambda_2$ (the next shortest wavelength) and a third wavelength selective filter 134 separates the GPON downstream wavelength $\lambda_3$ from the XGPON downstream wavelength $\lambda_4$ (the longest wavelength in the system), which is associated with a fourth wavelength selective filter 136. At port 123, a fifth wavelength filter 137 is used to split or combine the GPON wavelengths. A sixth wavelength filter 139 at port 125 is similarly used to split or combine the XGPON wavelengths.

Following an exemplary downstream signal flow from first port 121 to the remaining ports 123 and 125, the GPON downstream signal operating at $\lambda_3$ will be rejected (i.e., "reflected") by first filter 130, second filter 132 and third filter 134, and will thereafter pass through fourth wavelength selective filter 136 and fifth filter 137, exiting cyclic WDM 120 at port 123. In a similar fashion, the downstream XGPON signal operating at $\lambda_4$ will be rejected by filters 130 and 132, then pass through filter 134 and sixth filter 139 and directed out along port 125. The GPON upstream signals (from a plurality of separate ONUs 114$_G$) operating at $\lambda_2$ will enter cyclic WDM 120 at port 123, be reflected by fifth filter 137 and redirected into second wavelength selective filter 132. This signal will pass through second filter 132 and reflected by first filter 130 so as to be coupled into feeder fiber 118. Similarly, the XGPON upstream signals operating at $\lambda_1$ will enter at port 125 and be re-directed by sixth filter 139 into first wavelength selective filter 130. These XGPON upstream signals will pass through filter 130 and be coupled into feeder fiber 118 to continue to propagate upstream toward OLT 110.

Figure 7:
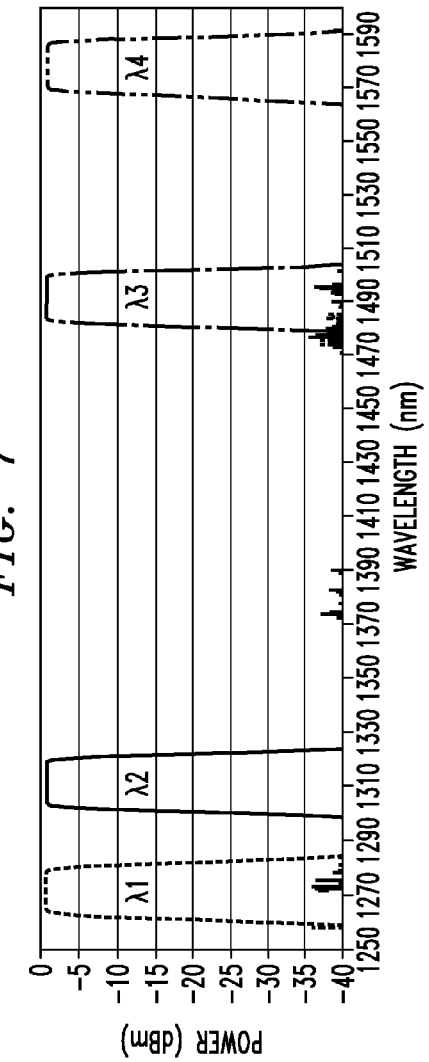
FIG. 7 is a graph depicting the wavelength selectivity of one exemplary cyclic WDM, in this case formed as a thin-film device.

FIG. 7 is a plot of the wavelength allocation for exemplary upstream and downstream GPON and XGPON signals passing through an exemplary cyclic WDM that was specifically configured for the purposes of the present invention. As shown, the wavelength allocation is well divided, with acceptable power levels shown for each signal.

In a preferred embodiment of the present invention, cyclic WDM 120 comprises a thin-film element, with the refractive index properties of the various layers specifically controlled to provide the desired wavelength filtering properties of elements 130, 132, 134, 136, 137 and 139. These devices are well-known in the art, and generally comprise amorphous semiconductor materials that are layered to form Fabry-Perot filters. The specifics of the formation of a thin-film cyclic WDM are not germane to the subject matter of the present invention and, therefore, are not described here in detail.

Figure 2:
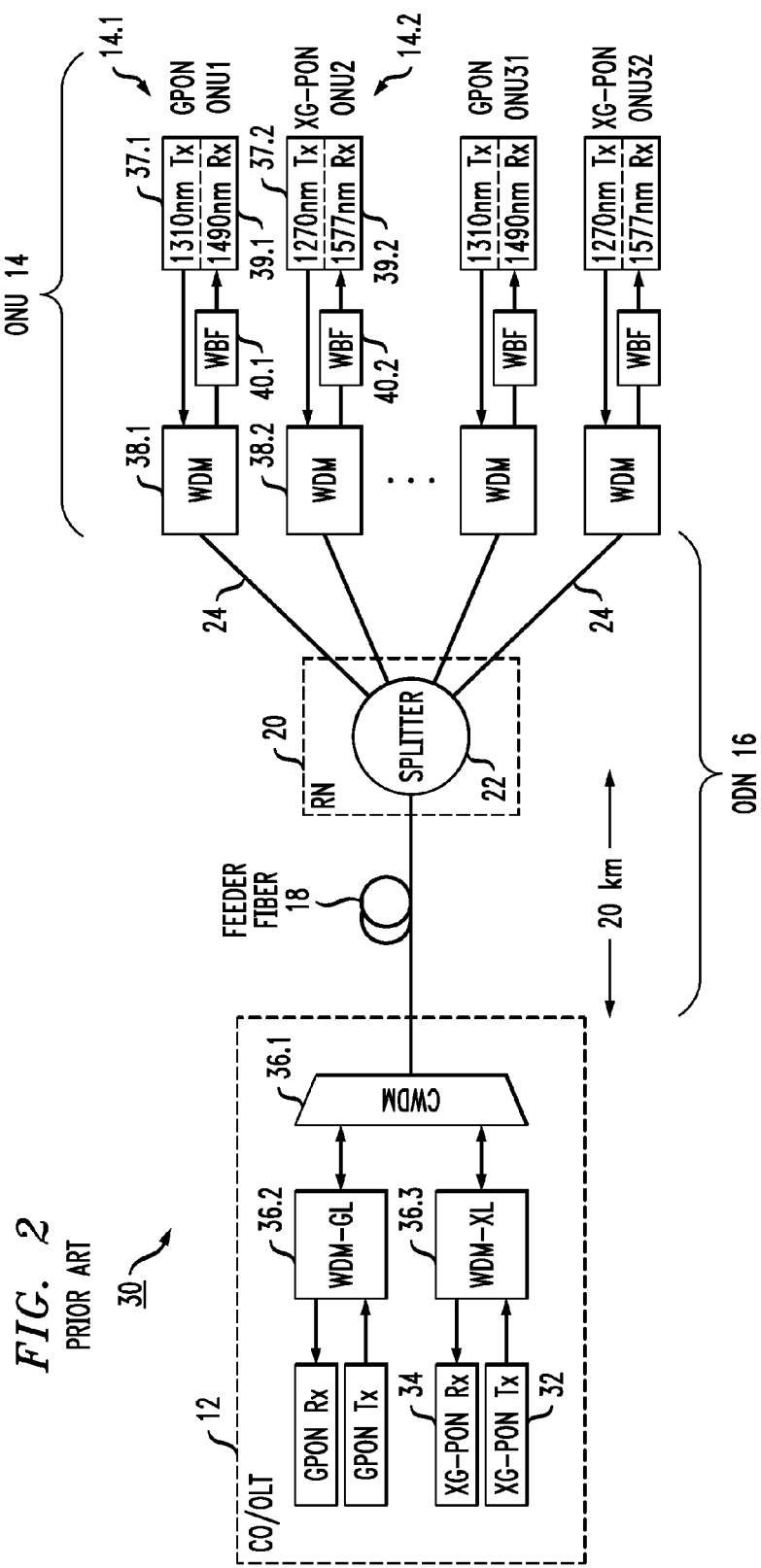
FIG. 2 illustrates an alternative prior art PON network that supports communication for both GPON and XGPON signals.

By virtue of using cyclic WDM 120 and separate power splitters 122$_G$ and 122$_X$ in remote node 116, it is possible to provide separate power splitting ratios for the GPON traffic and the XGPON traffic, a benefit not possible in the remote node 20 of the prior art configuration as shown in FIG. 2. This ability to separately control the splitting ratios for the GPON and XGPON communications is considered to be a significant advantage of this embodiment of the present invention. For example, since most GPON systems have a larger loss budget than the XGPON signals (i.e., can tolerate a higher level of loss between transmitter and receiver), power splitter 122$_G$ may have a larger splitting ratio than power splitter 122$_X$. In the particular embodiment illustrated in FIG. 3, power splitter 122$_G$ is shown as having a 1:64 power splitting ratio and power splitter 122$_X$ is shown as having a 1:32 power splitting ratio. In a more general form, splitting ratios for power splitter 122$_G$ in the range of 1:16 to 1:128 and for power splitter 122$_X$ in the range of 1:16 to 1:64 have been found to be acceptable.

It is to be understood, however, that in its most general terms the remote node of the present invention is not so limited and it is possible that certain arrangements may utilize a larger split ratio for the XGPON portion of the network. Indeed, in its most general form, it is also possible to utilize a conventional power splitter (as shown in prior art FIG. 2) with an OLT 112 formed in accordance with the present invention to provide distributed Raman amplification for each upstream signal and thereby increase the reach and split ratio for co-existing GPON and XGPON systems.

Returning to the description of FIG. 3, ONUs 114 are illustrated as separate sets, with a first group of 64 ONUs 114$_G$ coupled to power splitter 122$_G$ and a second group of 32 ONUs 114$_G$ coupled to power splitter 122$_X$. As a result of specifically allocating the ONUs for the two different systems, simpler optics and electronics can be used within each module. That is, a WDM 116.1 located within an ONU 114$_G$ only needs to separate and combine the GPON system wavelengths (e.g., 1310 nm and 1490 nm). Similarly, a WDM 116.2 located within an ONU 114$_X$ only needs to separate and combine the XGPON system wavelengths, namely, 1270 nm and 1577 nm. Obviously while each ONU is shown as a stand-alone unit, it is to be understood that a single physical location may be using both the GPON and XGPON systems and thus include both an ONU 114$_G$ and an ONU 114$_X$.

Figure 8:
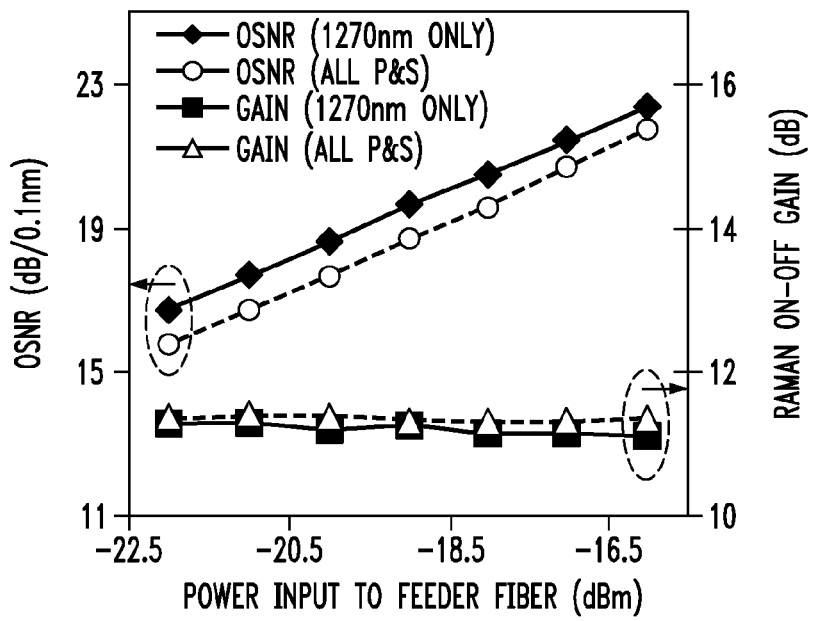
FIG. 8 is a plot of both gain and optical signal-to-noise ratio (OSNR) as a function of input power to the feeder fiber of the system of the present invention, where FIG. 8($a$) is a plot for the upstream GPON signal and FIG. 8($b$) is a plot for the upstream XGPON signal.
Figure 8:
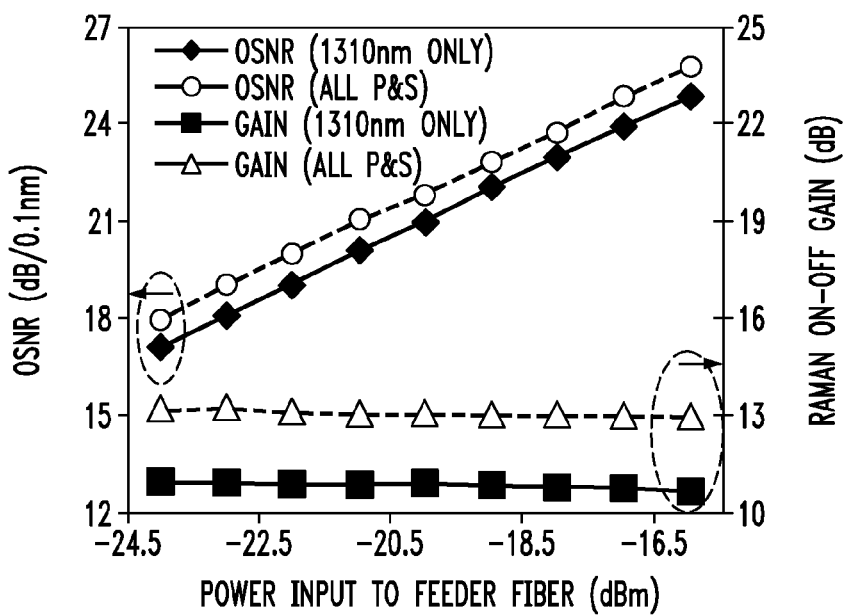
Figure 9:
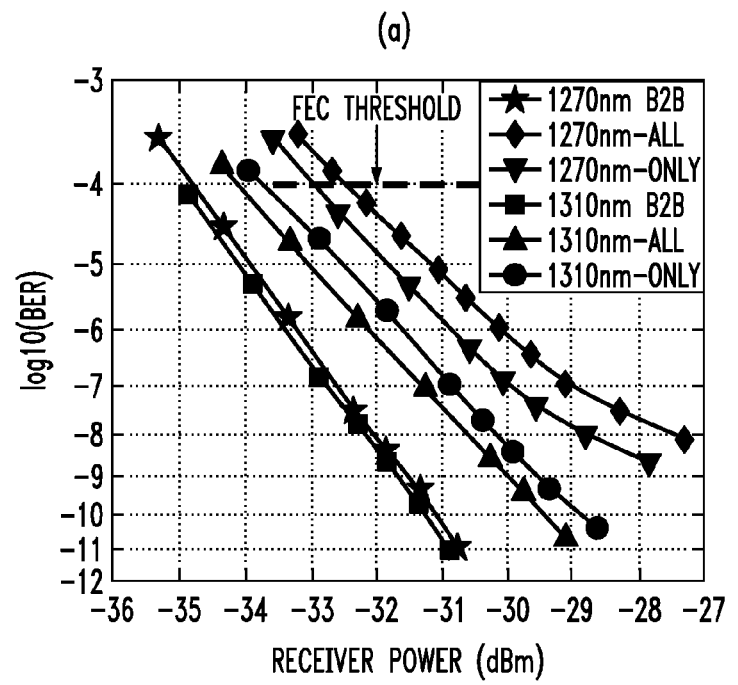
FIG. 9 plots the bit error rate (BER) for various configurations of an XGPON/GPON system formed in accordance with the present invention, the plots in FIG. 9($a$) for received signals (both upstream and downstream) in a GPON system and the plots in FIG. 9($b$) for received signals (upstream and downstream) in an XGPON system.
Figure 9:
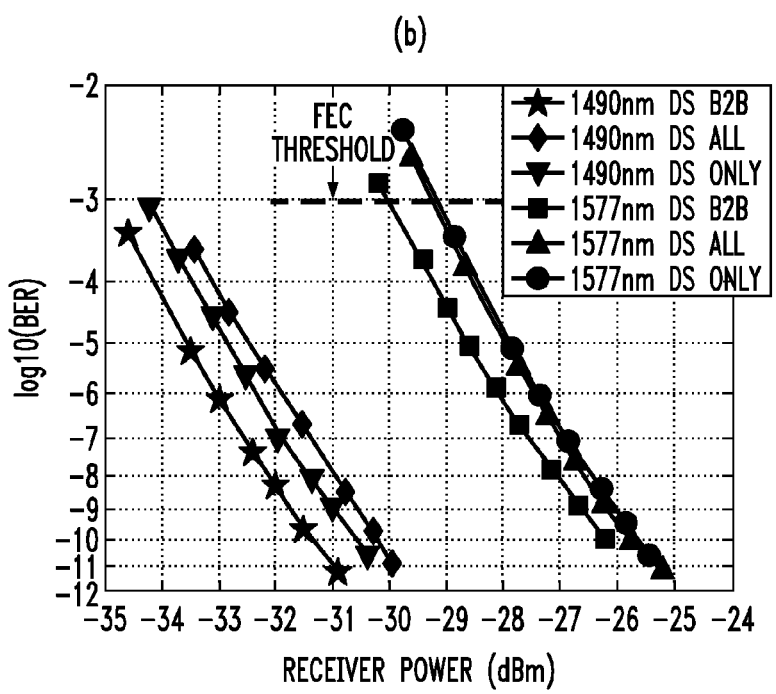

FIGS. 8 and 9 illustrate a set of performance results for a specific experimental configuration of the GPON-XGPON co-existing network as described above in association with FIG. 3. In the experimental configuration, OLT 110 was separated from remote node 116 by a 50-km length of optical fiber (in this specific example, a 50-km length of ALL-WAVE® optical fiber supplied by OFS, which is capable of supporting transmission at all of the wavelengths of interest with minimal distortion and loss). The "narrowband" option was selected for the GPON upstream wavelength (i.e., 1300-1320 nm), as defined in ITU G.984.5, which avoids the possibility of requiring pumps at more than one wavelength. To accommodate the extended reach of 50 km, a pair of low-cost SOAs 110.3 and 110.4 were included and used to boost the 1490 nm GPON downstream signal and the 1577 nm XGPON downstream signal, respectively. The EML source for XGPON transmitter 110.2 was modulated at 10.7 Gb/s ($2^{23}-1$) with a pseudo-random binary sequence (PRBS) from a pattern generator having a 0 dBm output power. A set of un-cooled laser diodes was used as transmitters for the 1270 nm XGPON upstream signals at ONUs 114$_X$, the 1310 nm GPON upstream signals at ONUs 114$_G$, and the 1490 nm downstream GPON signal, where all were directly modulated at 2.5 Gb/s ($2^{31}-1$) with a PRBS created by a separate pattern generator. A commercially available APD with a broadband pre-amplifier and clock recovery circuit was used as a XGPON downstream receiver at ONUs 114$_X$.

FIG. 8 includes plots of both the Raman on-off gain and optical signal-to-noise ratio (OSNR), the latter with a 0.1 nm resolution, for the upstream GPON and XGPON signals associated with this experimental configuration. In particular, FIG. 8(a) displays the results for an XGPON upstream data signal at 1270 nm, and FIG. 8(b) displays the results for a GPON upstream data signal at 1310 nm. The plots are shown as a function of input signal power into the 50-km feeder fiber, both "with" and "without" the pumps (P) and communication signals (S) being present. The various input signal power levels represent the cases of different losses associated with the remote node, as a function of different split ratios.

In each case, the Raman on-off gain is virtually constant. However, the OSNR is shown to be reduced when the input power decreases. The pump powers for 1206 nm and 1240 nm were fixed at 850 mW and 520 mW, respectively, which were optimized to ensure GPON and XGPON error-free operation. The plots show each operating alone, or both at the same time, for a 50-km reach and a 1:96 split system.

Due to pump interaction, the OSNR of the XGPON signal drops by about 0.8 dB and the Raman on-off gain is slightly changed when the 1240 nm pump and the 1310 nm upstream GPON signals are both turned on, as shown in FIG. 8(a). In contrast and as shown in FIG. 8(b), the OSNR and Raman on-off gain of the GPON upstream signal are increased by 0.9 and 2.2 dB, respectively, when the 1206 nm pump and the 1310 nm upstream XGPON signal are turned on. This difference in result is attributed to the fact that the 1206 nm XGPON pump also provides Raman gain for the GPON 1310 nm signal, as discussed above in association with FIG. 4.

FIG. 9 illustrates the bit error ratio (BER) performance of this experimental configuration of the GPON/XGPON system of the present invention, where FIG. 9(a) plots the BER values for the upstream GPON and XGPON data rates and FIG. 9(b) plots the BER values for the downstream GOPN and XGPON data rates. The threshold "acceptable" value associated with forward error correction (FEC) also shown, having a value of $10^{-4}$ for the upstream XGPON signal and $10^{-3}$ for the downstream XGPON signals. The plots are prepared to show the BER values for instances when each system is operating "alone" (indicated as the "only" plots), as well as the case where both the GPON and XGPON signals are being transmitted (indicated as the "all" plots).

Figure 10:
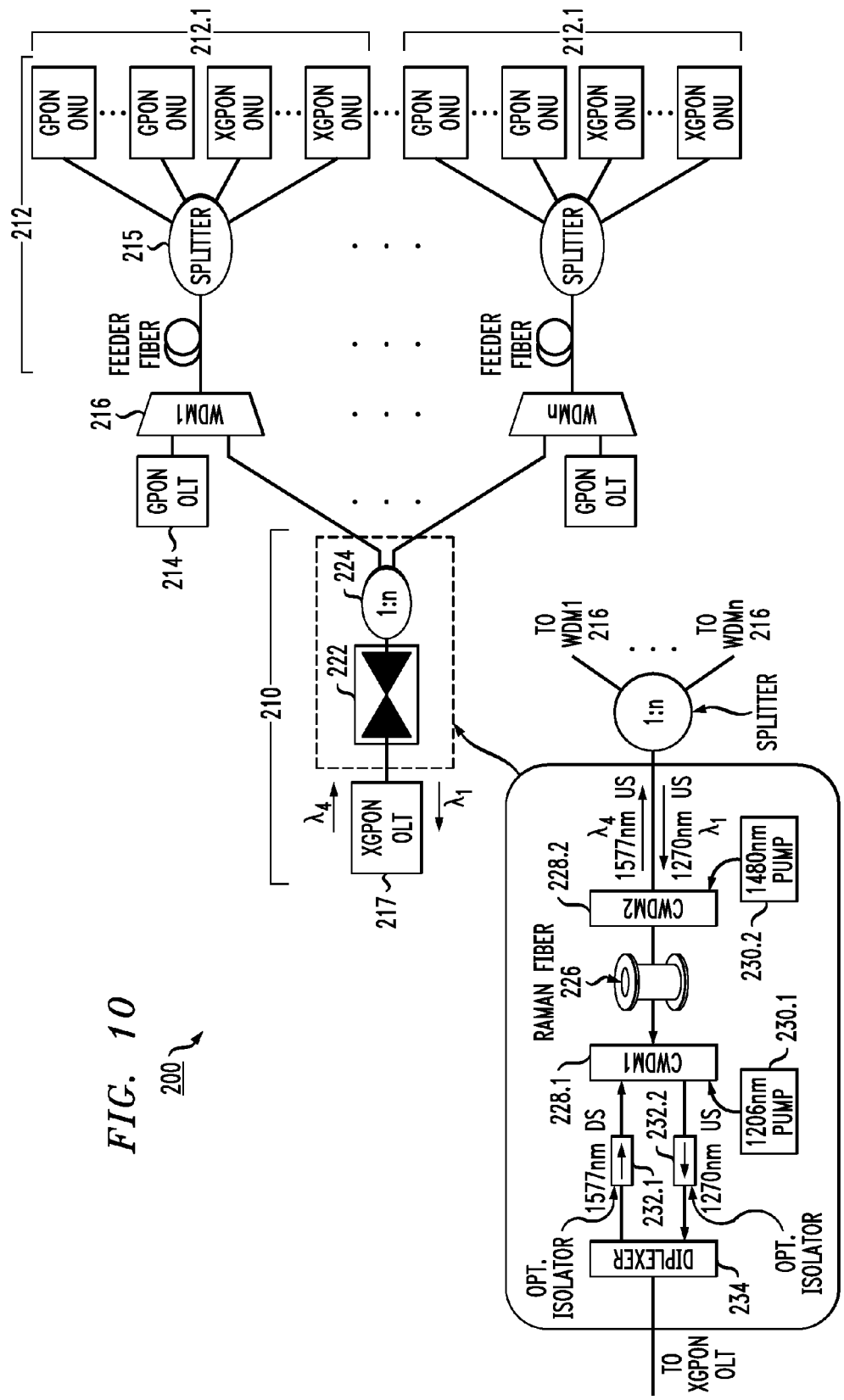
FIG. 10 illustrates an alternative embodiment of the present invention, in this case illustrating the sharing of a single XGPON system among a plurality of n separate GPON networks, in the form of a 1:n overlay, with the XGPON system utilizing a bidirectional discrete Raman amplifier element to provide power boosting for both the upstream and downstream XGPON signals.

While the 1:1 incorporation of an XGPON network with an existing GPON network is able to accommodate both systems, it can be relatively expensive to implement and may exhibit density problems in some situations as a result of its complexity and the relatively high power consumption of the XGPON portion of the OLT. An alternative embodiment of the present invention that addresses this concern is illustrated in FIG. 10, which shows a single XGPON network that is shared between a plurality of "n" separate GPON networks. This 1:n overlay of an XGPON network on a number of separate GPON networks is considered a preferred embodiment in some cases, since the use of a single XGPON OLT reduces the size of the overall system, while also allowing a sharing of the XGPON expenses across a number of separate GPON networks.

As shown in FIG. 10, an exemplary 1:n XGPON:GPON overlay network 200 comprises a single XGPON network 210 that is shared by a plurality of "n" separate GPON networks 212.1-212.n by using a bi-directional optical amplifier 222 and a 1:n splitter 224. As described in detail below, bi-directional optical amplifier 222 may comprise a bi-directional discrete Raman amplifier, or an erbium-doped fiber amplifier (EDFA) with distributed Raman amplification.

In this specific embodiment of FIG. 10, an exemplary GPON OLT 214 is able to accommodate the XGPON signals by using a WDM 216, which may take the form of a cyclic WDM, as discussed above. It is also possible that a 1:n XGPON:GPON overlay network may utilize additional Raman pumps at one or more of the GPON OLTs 214 to provide amplification for the GPON upstream signals. In that case, the GPON OLTs would incorporate the Raman pump sources of the present invention as shown in FIG. 3. Additionally, one or more of the GPON networks may utilize a splitter 215 that includes separate power splitters for the GPON and XGPON signals, as discussed above in association with FIG. 3.

In accordance with the overlay architecture of this embodiment of the present invention as shown in FIG. 10, a separate optical distribution network is utilized to share the signals associated with the single XGPON network 210 among the plurality of n GPON networks 212. Referring to FIG. 10, XGPON network 210 is shown as comprising an XGPON OLT 217 for transmitting a downstream XGPON signal operating at $\lambda_4$ and receiving a plurality of burst-mode transmitted upstream XGPON signals operating at $\lambda_1$. Bi-directional optical amplifier 222 is used to compensate for the additional loss associated with 1:n splitter 224 and WDM 216. In particular, bi-directional optical amplifier 222 is specifically configured to address the loss associated with the 1:n split in the overlay configuration and provide sufficient amplification to the downstream XGPON signal to allow for acceptable levels to reach the furthest XGPON ONU location, while also amplifying the various received upstream signals to compensate for the loss associated with 1:n splitter 224.

As shown in the enlarged diagram portion of FIG. 10, this particular embodiment of bi-directional optical amplifier 222 is shown as comprising a discrete Raman amplifier including a length of fiber 226 which functions as a fiber Raman amplifier in the presence of pumps operating at the proper wavelengths. A first pump source 230.1 operating at a wavelength of 1206 nm (for this particular embodiment) is included in this specific embodiment, where a pump beam from source 230.1 passes through a first WDM 228.1 and is coupled into Raman fiber 226. This pump is used as a counter-propagating amplification for the XGPON upstream signals (operating at $\lambda_1$=1270 nm for this particular embodiment). These various XGPON upstream signals originate at the multiple XGPON ONUs and thereafter propagate along feeder fiber 118 and pass through WDM 216 upward along the signal path through splitter 224 to XGPON OLT 217. As a result of the additional loss associated with splitter 224, the high-power Raman amplification within amplifier 222 is important in ensuring that accurate data signal recovery is possible.

Referring again to bi-directional optical amplifier 222, a second pump source 230.2 is used to provide a counter-propagating pump at a wavelength of 1480 nm (for example) to provide Raman amplification for the downstream XGPON signal (at a nominal wavelength of $\lambda_4$=1577 nm). As shown, the pump output from second pump source 230.2 passes through a second coarse WDM 228.2 and is coupled into Raman fiber 226.

Advantageously, this embodiment is considered to have superior system performance when compared with arrangements using SOAs for downstream signal amplification, since Raman amplification is more selective and does not amplify noise to the same degree that an SOA will. Additionally, use of a counter-propagation pumping scheme for the XGPON downstream signal allows for improved non-linear performance and high gain. In this particular embodiment, optical isolators 232.1 and 232.2 are disposed along the separate signal paths output from WDM 228.1 and operate in conjunction with a wavelength diplexer 234 to couple upstream and downstream XGPON signals between XGPON OLT 217 and WDM 228.1.

Figure 11:
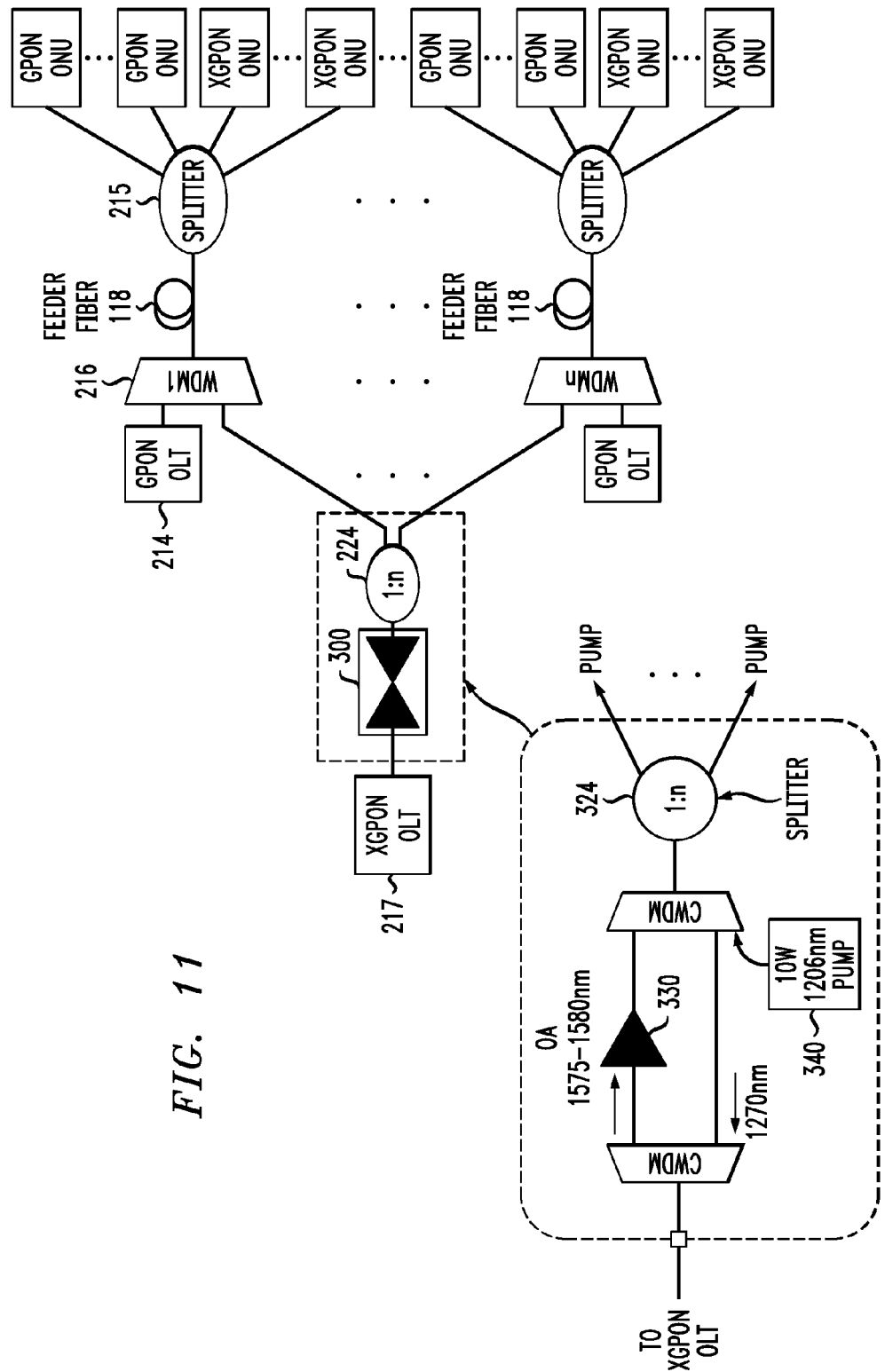
FIG. 11 illustrates an alternative embodiment of the 1:n overlay arrangement of the present invention, where in this case a high power counter-propagating pump is used to created distributed gain throughout the feeder fibers for the various XGPON upstream signals propagating towards the XGPON OLT.

An alternative solution for accommodating the additional losses associated with the 1:n overlay arrangement is shown in FIG. 11. As shown, a bi-directional optical amplifier 300 is formed to include a discrete optical amplifier 330 is used to amplify the downstream XGPON signal and a high-power pump source 340 is used to provide a counter-propagating pump that is distributed across the plurality of n GPON networks to amplify the upstream XGPON signals. Discrete optical amplifier 330 may comprise an L-band EDFA or appropriate SOA. With respect to providing high-power pump source 340, very high powers are readily available from fiber lasers and amplifiers, and both splitters and WDMs have demonstrated high power-handling capability.

Referring to FIG. 11, the high power pump output from pump source 340 passes through 1:n splitter 224 to create a plurality of n sub-pumps (still of relatively high power), which then pass through the associated WDM 216 to enter feeder fiber 118. In this arrangement, therefore, the distributed pump provides amplification to the upstream XGPON signals along an extended portion of feeder fiber 118. By virtue of using a high power pump, large values of n (e.g., n>16) may be possible. As a result, a single XGPON arrangement can overlay more GPONs while achieving reach extensions similar to that of a single GPON system.

While not explicitly shown, it is to be understood that there are various embellishments known to those skilled in the art that can be used to improve the reach and/or split of the combined XGPON and GPON systems in a manner similar to those used to extend the reach/split of the GPON systems.

What is claimed is:

1. A passive optical distribution network supporting bi-directional communication for a plurality of different bit rate communication systems, each different bit rate communication system associated with a different pair of upstream and downstream communication wavelengths, the network comprising
   a transmission fiber for carrying a plurality of downstream signals, each downstream signal associated with a different bit rate system and using a different downstream wavelength, and a multiplicity of upstream signals, groups of upstream signals associated with different bit rate systems and each group using a different upstream wavelength;
   a plurality of optical pump sources coupled to a near-end termination of the transmission fiber for providing a plurality of counter-propagating pumps at different pump wavelengths, each pump wavelength associated with a different group of upstream signals and utilized to create Raman amplification of the multiplicity of upstream signals along at least an extended portion of the transmission fiber; and
   a passive remote node coupled to a far-end termination of the transmission fiber, the passive remote node comprising:
      a cyclic wavelength division multiplexer (WDM) including a common port coupled to the transmission fiber and a plurality of signal ports with a separate signal port associated with each different bit rate system, the cyclic WDM comprising a plurality of wavelength-selective elements for separating the plurality of downstream signals entering at the common port such that downstream signals exit at the separate signal ports associated with the different bit rate systems, the cyclic WDM also receiving groups of upstream signals at the plurality of signal ports, each signal port receiving a group of upstream signals associated with a different bit rate system, and directing the upstream signals through the wavelength-selective elements to exit at the common port and be coupled into the transmission fiber; and
      a plurality of power splitters, each power splitter coupled to a separate signal port and associated with a different bit rate system, each power splitter for dividing its associated downstream signal into a plurality of sub-signals to be transmitted to a set of predefined optical network units associated with that bit rate system, and receiving upstream signals therefrom.

2. The passive optical distribution network of claim 1 further comprising at least one discrete optical amplifier associated with a source of downstream signals to provide optical amplification thereto prior to entering the transmission fiber.

3. The passive optical distribution network of claim 2 wherein the at least one discrete optical amplifier comprises a plurality of discrete optical amplifiers, associated with a plurality of sources of downstream signals, each operating in a different bit rate system, in a one-to-one relationship.

4. The passive optical distribution network of claim 2 wherein the at least one discrete optical amplifier is selected from the group consisting of: semiconductor optical amplifiers, discrete Raman amplifiers and doped fiber amplifiers.

5. The passive optical distribution network of claim 1 wherein each power splitter is configured to have a split ratio selected specifically for use with the associated bit rate system.

6. The passive optical distribution network of claim 1 where the downstream signals operate in continuous mode transmission and the upstream signals operate in burst mode transmission.

7. The passive optical distribution network of claim 1 wherein the plurality of different bit rate systems comprises a pair of different bit rate systems and the remote node includes a pair of power splitters comprising a first power splitter associated with a first bit rate system of the pair of different bit rate systems and a second power splitter associated with a second bit rate system of the pair of different bit rate systems.

8. A passive optical distribution network as defined in claim 7 wherein the first bit rate system is a GPON bit rate system and the second bit rate system is an XGPON bit rate system.

9. A passive optical distribution network as defined in claim 8 wherein the GPON bit rate system utilizes an upstream GPON signal wavelength within the range of approximately 1290-1330 nm and a pump wavelength within the range of approximately 1225-1260 nm to provide Raman gain to the upstream GPON signal along an extended portion of the transmission fiber, the GPON bit rate system also utilizing a downstream GPON wavelength within the range of approximately 1480-1490 nm.

10. A passive optical distribution network as defined in claim 9 configured in accordance with a narrowband wavelength option defining an upstream GPON wavelength range of approximately 1300-1320 nm.

11. A passive optical distribution network as defined in claim 8 wherein the XGPON bit rate system utilizes an upstream XGPON signal wavelength within the range of approximately 1260-1280 nm and a pump wavelength within the range of approximately 1201-1211 nm to provide Raman gain to the upstream XGPON signals along an extended portion of the transmission fiber, and also a downstream XGPON wavelength within the range of 1575-1580 nm.

12. A passive optical distribution network as defined in claim 8 wherein the GPON system utilizes an upstream GPON wavelength within the range of approximately 1290-1330 nm and a first pump wavelength within the range of approximately 1225-1260 nm to provide Raman gain to the upstream GPON signals, and the XGPON bit rate system utilizes an upstream XGPON signal wavelength within the range of approximately 1260-1280 nm and a second pump wavelength within the range of approximately 1201-1211 nm to provide Raman gain to the upstream XGPON signals, wherein a second pump power for the XGPON upstream signals is determined to provide sufficient gain to the upstream XGPON signals, while also compensating for power transfer from the second pump to the first pump.

13. A passive optical distribution network as defined in claim 12 wherein a tail region of the power of the first pump source is maintained to be less than power of the XGPON upstream signal where the XGPON signal wavelengths are in close proximity to the tail region.

14. A passive optical distribution network as defined in claim 12 wherein the first pump wavelength is selected to minimize interaction with the XGPON upstream signal wavelength.

15. A passive optical distribution network as defined in claim 7 wherein the transmission fiber comprises a length in the range of about 20-60 km, with the first power splitter having a ratio in the range of 1:16 to 1:128 and the second power splitter having a ratio in the range of 1:16 to 1:64.

16. A network architecture for overlaying a first bi-directional optical communication system operating at a first set of data rates on a plurality of n second bi-directional optical communication systems operating at a second set of data rates, the network architecture including
   a bi-directional optical amplifier coupled to an optical line terminal of the first system operating at the first set of data rates, the bi-directional optical amplifier including a Raman pump source for providing counter-propagating Raman amplification to upstream optical communication signals associated with the first system and operating at the first set of data rates, the bi-directional optical amplifier further including a discrete optical amplifier for providing amplification to the downstream communication signal at the first set of data rates; and
   a 1:n power splitter disposed at the output of the bi-directional optical amplifier, with each n drop-line fiber output from the 1:n power splitter coupled to a separate optical line terminal of the plurality of n systems, each drop-line for supporting the propagation of a downstream sub-signal associated with the first system, operating at the first set of data rates, to an associated optical line terminal of the second system and also supporting the propagation of upstream signals associated with the first system and operating at the first set of data rates.

17. A network architecture as defined in claim 16 wherein the Raman amplification of the upstream communication signals is provided by a discrete Raman amplifier disposed within the bi-directional optical amplifier and comprising a length of Raman fiber.

18. A network architecture as defined in claim 17 wherein the bi-directional optical amplifier further comprises a second Raman pump source coupled to the Raman fiber for use as the discrete optical amplifier for the downstream communication signal.

19. A network architecture as defined in claim 16 wherein the Raman amplification of the upstream communication signals is provided by a high power Raman pump which passes through the 1:n power splitter and distributes a Raman pump into each system of the plurality of n systems.

20. A network architecture as defined in claim 19 wherein the bi-directional amplifier further comprises a discrete semiconductor optical amplifier for providing amplification for the downstream communication signal.

21. A network architecture as defined in claim 16 wherein the first system comprises an XGPON bit rate system and the plurality of n systems comprises a plurality of n GPON bit rate systems, forming an XGPON:GPON overlay architecture.

22. A network architecture as defined in claim 21 wherein each GPON bit rate system includes a passive remote node comprising a wavelength division multiplexer and first and second power splitters disposed at the output thereof, the first power splitter associated with a GPON bit rate system of the plurality of n GPON bit rate systems and the second power splitter associated with the XGPON bit rate system.

23. An optical line terminal for use in a bi-directional optical communication network supporting a plurality of different bit rate optical communication systems, each system defined by utilizing a different bit rate and using different upstream and downstream communication signal wavelengths, the optical line terminal comprising:
   a plurality of separate optical transmitters, each optical transmitter for providing a downstream communication signal for an associated system at its associated bit rate,
   a plurality of separate optical receivers, each optical receiver for recovering an upstream communication signal associated with a different system operating at its associated bit rate,
   a plurality of optical pump sources for providing a plurality of counter-propagating pumps at different pump wavelengths for each bit rate system so as to create Raman amplification of the upstream communication signals along at least an extended portion of a transmission fiber; and
   a wavelength division multiplexer for coupling signals between a transmission fiber and the optical transmitters, receivers and pump sources within the optical line terminal.

24. An optical line terminal as defined in claim 23 wherein the terminal further comprises at least one discrete optical amplifier associated with at least one optical transmitter to provide amplification for a downstream communication signal.

25. An optical line terminal as defined in claim 24 wherein the at least one discrete optical amplifier comprises a plurality of discrete optical amplifiers, each associated with a different system.

26. An optical line terminal as defined in claim 24 wherein the at least one discrete optical amplifier is selected from the group consisting of: semiconductor optical amplifiers, discrete Raman amplifiers and doped fiber amplifiers.

27. An optical line terminal as defined in claim 23 wherein the plurality of different optical communication systems comprises a GPON bit rate system and an XGPON bit rate system.

28. An optical line terminal as defined in claim 27 wherein the GPON bit rate system transmitter comprises a distributed feedback laser diode and the XGPON bit rate system transmitter comprises an externally-modulated laser (EML) device.

* * * * *